(12) United States Patent
Jessen et al.

(10) Patent No.: US 10,310,792 B2
(45) Date of Patent: Jun. 4, 2019

(54) MECHANISM FOR GENERATING INDEX SEPARATOR PAGES

(75) Inventors: Robert F. Jessen, Berthoud, CO (US); Philip K. Cihiwsky, Loveland, CO (US); Dean O. Miller, Littleton, CO (US); Jeffrey A. Sikkink, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 694 days.

(21) Appl. No.: 13/013,214

(22) Filed: Jan. 25, 2011

(65) Prior Publication Data
US 2012/0188573 A1  Jul. 26, 2012

(51) Int. Cl.
*G06F 3/12*  (2006.01)

(52) U.S. Cl.
CPC .......... *G06F 3/1285* (2013.01); *G06F 3/1219* (2013.01); *G06F 3/1262* (2013.01); *G06F 3/1205* (2013.01); *G06F 3/1221* (2013.01); *G06F 3/1267* (2013.01); *Y02D 10/1592* (2018.01)

(58) Field of Classification Search
USPC ................................. 358/1.12, 1.13
See application file for complete search history.

(56) References Cited

U.S. PATENT DOCUMENTS

| | | |
|---|---|---|
| 6,373,588 B1 | 4/2002 | Fischer et al. |
| 2002/0089689 A1 | 7/2002 | Ferlitsch et al. |
| 2004/0042042 A1* | 3/2004 | Utsunomiya ......... G06F 3/1205 358/1.15 |
| 2005/0185220 A1 | 8/2005 | Martinez |
| 2006/0033958 A1 | 2/2006 | d'Entrecasteaux |
| 2006/0126101 A1 | 6/2006 | Shutt et al. |
| 2009/0244585 A1* | 10/2009 | Mitsui .................. G06F 3/1205 358/1.13 |
| 2009/0290186 A1* | 11/2009 | Rocas .................. G06F 3/1207 358/1.15 |
| 2010/0091319 A1* | 4/2010 | Mandel ................. G06F 3/1204 358/1.15 |

FOREIGN PATENT DOCUMENTS

| | | |
|---|---|---|
| JP | 09034836 | 2/1997 |
| JP | 11349207 A | * 12/1999 |
| KR | 2005106566 | 11/2005 |

OTHER PUBLICATIONS

Shinozaki, Kazuya, Printing Device and Print Processing Method Therefor, Dec. 21, 1999, Fig 14, par 0057, 0067, 0082 (Year: 1999).*

* cited by examiner

*Primary Examiner* — Miya J Williams
(74) *Attorney, Agent, or Firm* — Jaffery Watson Mendonsa & Hamilton LLP

(57) ABSTRACT

A printing system is disclosed. The printing system includes a storage device and a print job manager that stores received print jobs in the storage device and facilitates the printing of multiple selected print jobs as a batch of print jobs. The print job manager includes a page generator to generate an index separator page including information for each of the selected print jobs with the batch of print jobs.

21 Claims, 4 Drawing Sheets

```
Index Separator Page

For User: Joe Doe
    March 24, 2010
       12:43 PM

Date/Time
Print Job Name:     Received            Pages:  Status:
1. Product ABC 2010 Plan Draft   3/19/2010 @ 3:32pm   20   Deleted  Expired
2. Monthly Quality Report        3/24/2010 @ 11:31am   8   Printed
3. Product ABC 2010 Plan         3/24/2010 @ 11:42am  23   Deleted - By User
4. Product ABC 2010 Plan (rev1)  3/24/2010 @ 12:26pm  23   Printed
5. Vacation sched 2010           3/24/2010 @ 12:32pm   2   Forwarded to Printer3

Total Print Jobs Processed – 5
Total Print Jobs Printed = 2
Total Print Job Pages Printed That Follow After This Page – 31
```

Figure 3

MECHANISM FOR GENERATING INDEX SEPARATOR PAGES

FIELD OF THE INVENTION

The invention relates to the field of printing systems, and in particular, to the management of print jobs produced at a printing system.

BACKGROUND

Computing centers that employ one or more printers to serve a group of users, such as a networked group or other work group, typically rely on the printers to batch process print jobs (e.g., print-out a series of different print jobs in succession). Such printers produce separator pages which are used for identification and segregation of print jobs in an office, departmental or other shared or multi-user printing environment. Separator pages generated at the beginning of a print job are commonly referred to as headers, while pages generated after a print job are referred to as trailers. Such separator pages include one or two lines of text that identify the requesting party and identify the job number.

Separator pages have an undesirable characteristic in that they are printed with associated printing costs, and are not environmentally friendly. For example, separator pages have very little value after the user retrieves their print job, and are in many instances not recycled. Since there is typically one per print job, separator pages are particularly wasteful for smaller print jobs on a per print job page basis.

An additional problem is that separator pages may be generated or controlled by host software, a printer object or the printer itself. Thus, a lack of coordination between these different separator page generation methods may result in multiple separator pages being generated for certain print jobs.

Accordingly, a mechanism to manage generation of separator pages is desired.

SUMMARY

In one embodiment a printing system is disclosed. The printing system includes a storage device and a print job manager that stores received print jobs in the storage device and facilitates the printing of multiple selected print jobs as a batch of print jobs. The print job manager includes a page generator to generate an index separator page including information for each of the selected print jobs with the batch of print jobs In another embodiment, a method discloses selecting two or more print jobs to be printed as a batch of print jobs, generating an index separator page including information for each of the selected print jobs with the batch of print jobs and printing the index separator page with the batch of print jobs.

In a further embodiment, a multifunction printer is disclosed that includes a controller and a print engine. The controller includes a storage device, a print job manager to store received print jobs in the storage device and to facilitate the printing of multiple selected print jobs as a batch of print jobs and a page generator to generate an index separator page including information for each of the selected print jobs with the batch of print jobs. The print engine prints the index separator page and at least one of the selected print jobs in the batch of print jobs

BRIEF DESCRIPTION OF THE DRAWINGS

A better understanding of the present invention can be obtained from the following detailed description in conjunction with the following drawings, in which:

FIG. 3 illustrates one embodiment of an index separator page; and

DETAILED DESCRIPTION

A mechanism for generating an index separator page is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
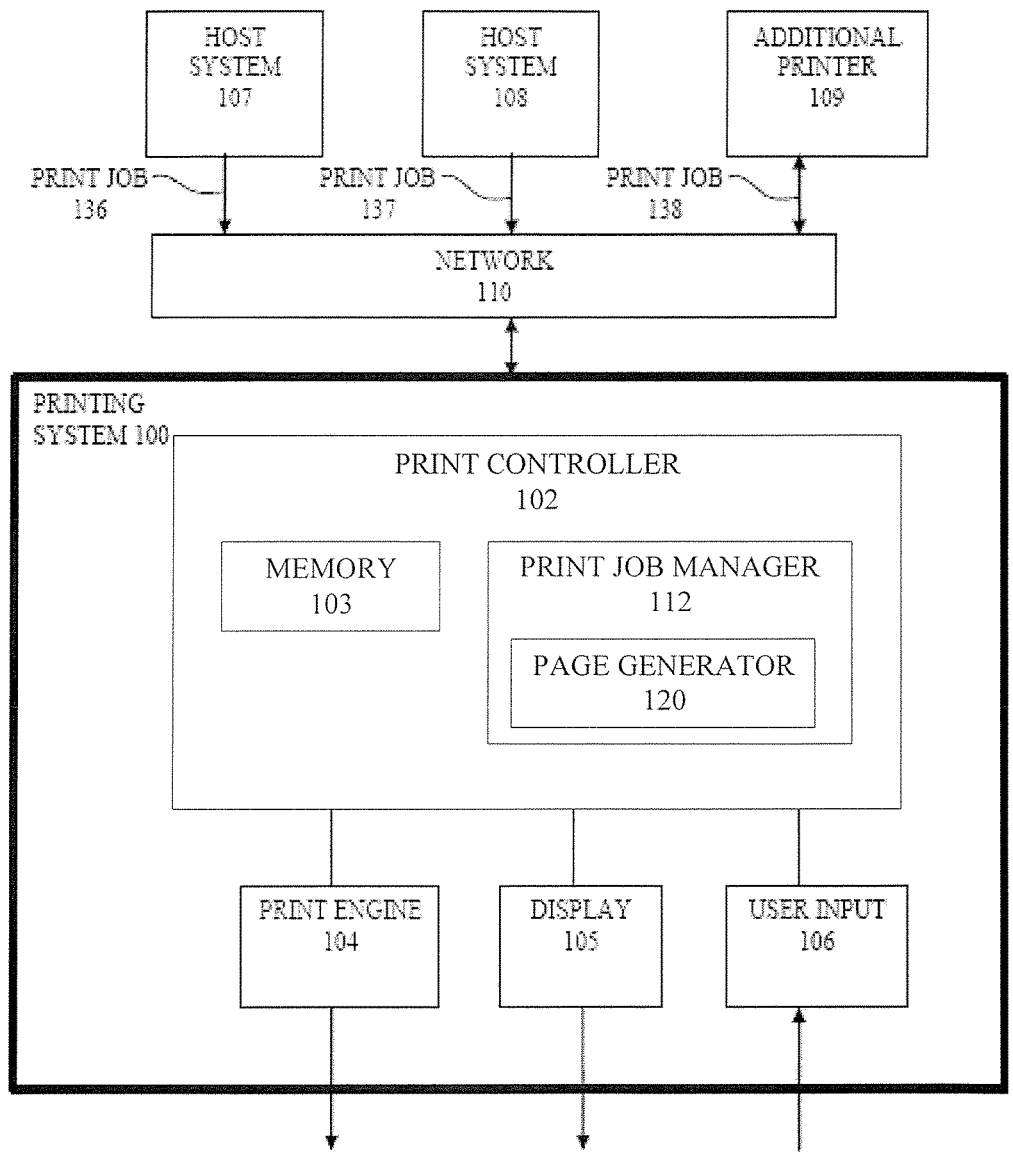
FIG. 1 illustrates one embodiment of a printing system.

FIG. 1 is a block diagram illustrating one embodiment of a printing system 100. Printing system 100 is a system used to provide marks on a media, such as a continuous forms printer or a cut sheet page printer. Printing system 100 may include any digital hardcopy output device, such as printers, copiers, multifunction printers (MFP's) and facsimiles.

In one embodiment, printing system 100 is shared by multiple users. In such an embodiment, printing system 100 includes a print controller 102 and one or more print engines 104. Print controller 102 includes any system, server, or components operable to interface one or more host systems 107 and 108, and a printer 109, via network 110 with one or more print engines 104, and to control the printing of print jobs 136-138 received from the host systems 107 and 108, and a printer 109, respectively, on print engine 104. Print engine 104 provides an imaging process to mark a printable medium, such as paper.

According to one embodiment, print controller 102 includes memory 103 and a print job manager 112. Memory 103 includes any storage system operable to store data. In one embodiment, print job manager 112 manages the printing of documents at printing system 100. Particularly, print job manager 112 controls print jobs as they wait to print, arranges the priority of the print jobs, generates separator pages and distributes jobs to the destination print engine 104. In one embodiment, print job manager 112 may be implemented using either InfoPrint Manager (IPM) or Info-Print ProcessDirector (IPPD), although other types of print job managers may be used instead.

In one embodiment, print job manager 112 holds received print jobs in memory 103 before processing the print job. In such an embodiment, memory 103 stores the print jobs as either a data file or rastorized file. For example, print jobs stored as rastorized files reduce print time for the held jobs versus those stored as data files. Once stored, each print job may be held until the user that generated the print job retrieves the corresponding document from printing system 100, at which time the print job is processed and printed.

In a further embodiment, a user may release a selected job for printing at printing system 100 via user input 106. Printing system 100 thereby processes the print job by printing via print engine 104. In still a further embodiment, multiple selected print jobs being held for a particular user may be simultaneously processed and printed at print engine 104. Therefore, all print jobs for the same user are printed together when multiple print jobs are released to print.

According to one embodiment, print job manager 112 includes a separator page generator 120 that is implemented to control the generation of print job separator pages for jobs stored in memory 103. In a further embodiment, print job manager 112 instructs separator page generator 120 to produce an index separator page. An index separator page is one or more physical printed pages that include information content for the multiple selected (or batched) print jobs that are simultaneously processed and printed. Thus, the index separator page consolidates all information content gathered for selected print jobs onto one separator page that prints once per batched jobs, thereby separating the selected print jobs from other users' print jobs.

In one embodiment, page generator 120 generates only an index separator page, with no separator pages for the individual jobs included in the batch. However in other embodiments, page generator 120 may also generate one separator page per printed job in addition to, or instead of, the index separator page, based on a desired configuration.

Figure 2:
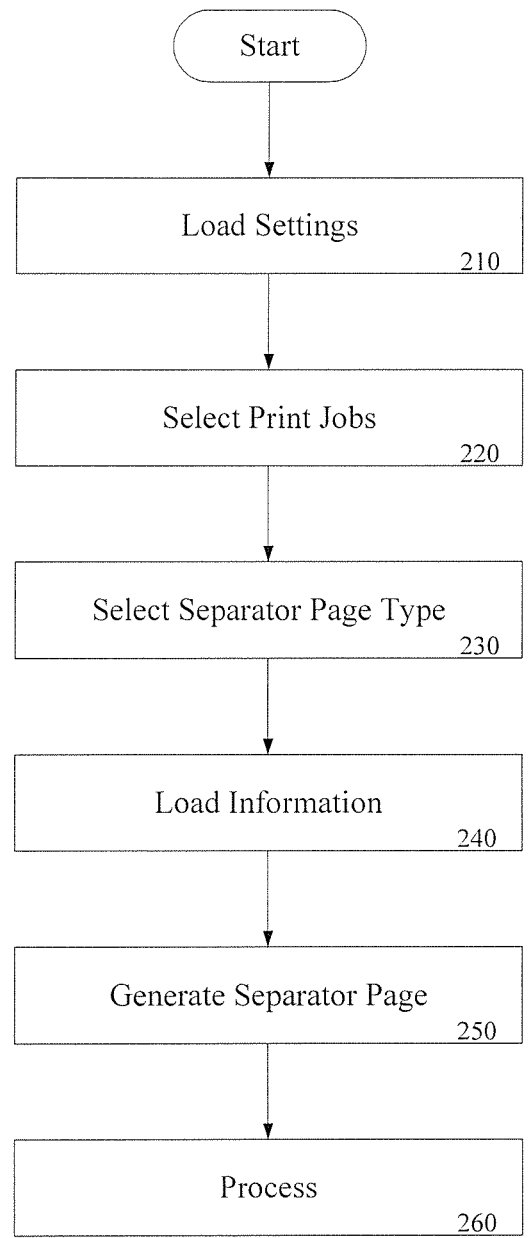
FIG. 2 is a flow diagram illustrating one embodiment of generating an index separator page.

FIG. 2 is a flow diagram illustrating one embodiment of managing print jobs at printing system 100. At processing block 210, separator page settings are loaded at page generator 120. According to one embodiment, separator page settings may include the format of index separator pages. For example, index separator page content may be configured to be included on one page only. However, the content may be extended beyond one page if necessary to include the information for all of the selected jobs. Additionally, a setting may indicate that an index separator page be placed before the first of the batched job, although other configurations may indicate that the index separator page to be placed either after the last printed job.

At processing block 220, the print jobs to print are selected at user input 106. However in other embodiments, the print jobs may be selected from a host. At processing block 230, page generator 120 selects a type of separator page. In one embodiment, page generator 120 is configured to generate only an index separator page, with no separator pages for the individual jobs included in the batch. However in other embodiments, page generator 120 may be configured to generate one separator page per printed job in addition to, or instead of, the index separator page.

At processing block 240, content from selected print jobs is loaded for generation of a separator page. According to one embodiment, index separator page content may include print job header information for all selected jobs, where print job header information includes one or more of: User Name, Print Job Name, Host Name, Queue Name, Originating IP address, Print job creation date, Print job creation time, etc.

In another embodiment, the index separator page content may include other print job information determined by further processing. For example, further processing information may include one or more of: Number of pages, Resources consumed (e.g., toner or ink coverage usage, sheets used, type of media used etc.), Print format parameters (duplex, n-up, toner darkness, number of copies), Disposition action (print, store, forward, email, facsimile transmission or delete), Disposition Result (e.g. success, or error), Disposition date, Disposition time, etc. By including this content the index separator page may include information about selected print jobs that did not actually print with the index separator page.

In a further embodiment, the index separator page content may include the above-described information in a tallied format for selected print jobs. For example, the index separator page may present the total number of pages printed, total resources consumed or total number of jobs for the total of all of the selected print jobs. Further, the index separator page content may be presented in various sorted presentations. For example, the content may be presented in an ascending order according to job received date and time, user names or print job names.

At processing block 250, the separator page is generated. At processing block 260, the print jobs and separator page are processed for printing. FIG. 3 illustrates one embodiment of an index separator page generated using the above-described process. As shown in FIG. 3, index separator page lists the print jobs processed for a user John Doe. Additionally, the index separator page includes summary information indicating the number of jobs processed (5), the number of jobs (2) actually printed, and the total number of printed pages (31) that follow the index separator page.

Although described as being an internal component of printing system 100, other embodiments may feature print job manager 112 and/or page generator 120 being implemented in other systems components, e.g., a host, PC, print spooler or print server.

Figure 4:
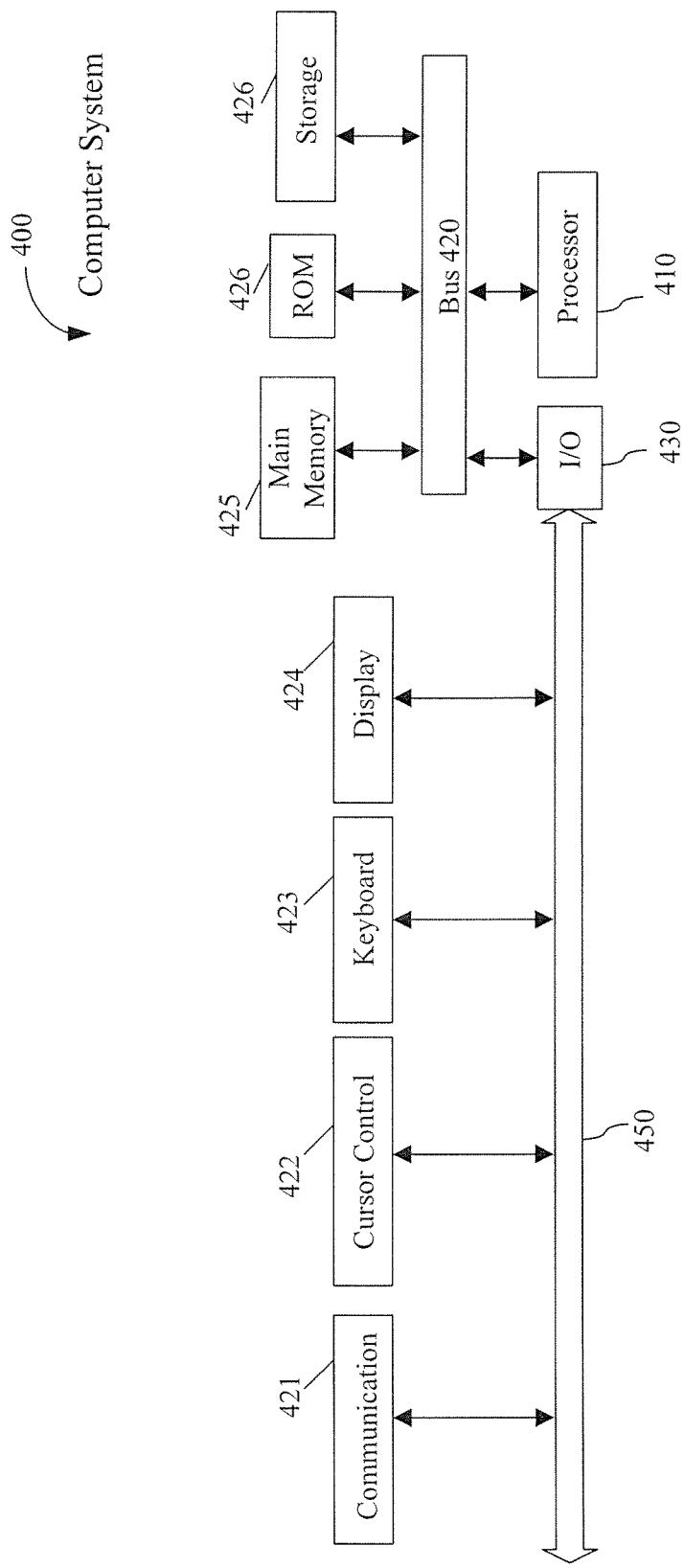
FIG. 4 illustrates one embodiment of a computer system.

FIG. 4 illustrates a computer system 400 on which printing system 100 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

The above-described mechanism generates and controls index separator pages that include information content about multiple print jobs, rather than a single print job as conventionally implemented. The index separator pages decrease the number of printed separator pages since only one index separator page is needed per print batch of selected print jobs. Additionally, the index separator pages include information about print jobs that were previously processed, but not printed.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A printing system comprising:
a storage device to store a plurality of print jobs; and
a processor to execute:
a user interface; and
a print job manager to receive a selection of two or more of the plurality of print jobs via the user interface as a first batch of print jobs and to release the first batch of print jobs for processing in response to the selection; and
a page generator to generate an index separator page including information for each of the two or more print jobs in the first batch of print jobs,
wherein the index separator page includes content information and disposition information indicating an action that has been performed for print jobs in the first batch of print jobs that did not print with the index separator page, wherein the disposition information further comprises a disposition date for each of the print jobs that did not print with the index separator page.

2. The printing system of claim 1 wherein the index separator page separates the first batch of print jobs from a second batch of print jobs.

3. The printing system of claim 1 wherein the index separator page includes print job header information for each print job in the first batch of print jobs.

4. The printing system of claim 1 wherein the index separator page includes print job processing information for each print job in the first batch of print jobs.

5. The printing system of claim 1 wherein the page generator generates a separator page for each print job in the first batch of print jobs in addition to the index separator page.

6. The printing system of claim 1 wherein an action indicated by the disposition information includes at least one of storing, forwarding, emailing, facsimile transmitting and deleting.

7. The printing system of claim 1 wherein page generator receives settings providing for a format of the index separator page.

8. The printing system of claim 1 further comprising a print engine to print the index separator page and at least one of the selected print jobs in the first batch of print jobs.

9. A method comprising:
receiving a selection of two or more of a plurality of stored print jobs as a first batch of print jobs via a user interface;
releasing the first batch of print jobs for processing in response to the selection;
generating an index separator page including information for each of the two or more print jobs in the first batch of print jobs, wherein the index separator page includes content information and disposition information indicating an action that has been performed for print jobs in the first batch of print jobs that did not print with the index separator page, wherein the disposition information further comprises a disposition date for each of the print jobs that did not print with the index separator page; and
transmitting the index separator page with the first batch of print jobs for printing.

10. The method of claim 9 further comprising loading format settings for the index separator page.

11. The method of claim 9 wherein generating the index separator page comprises loading content information for each print job in the first batch of print jobs.

12. The method of claim 11 wherein an action indicated by the disposition information includes at least one of storing, forwarding, emailing, facsimile transmitting and deleting.

13. The method of claim 9 wherein the index separator page includes print job header information for each print job in the first batch of print jobs.

14. The method of claim 9 wherein the index separator page includes print job processing information for each print job in the first batch of print jobs.

15. A printer comprising:
a controller, including:
a storage device to store a plurality of print jobs; and
a processor to execute:
a user interface; and
a print job manager to receive a selection of two or more of the plurality of print jobs via the user interface as a first batch of print jobs and to release the first batch of print jobs for processing in response to the selection; and
a page generator to generate an index separator page including information for each of the two or more print jobs in the first batch of print jobs,
wherein the index separator page includes content information and disposition information indicating an action that has been performed for print jobs in the first batch of print jobs that did not print with the index separator page, wherein the disposition information further comprises a disposition date for each of the print jobs that did not print with the index separator page.

16. The printer of claim 15 further comprising a print engine to print the index separator page and at least one of the selected print jobs in the first batch of print jobs.

17. The printer of claim 15 wherein the index separator page includes print job header information for each print job in the first batch of print jobs.

18. The printer of claim 15 wherein the index separator page includes print job processing information for each print job in the first batch of print jobs.

19. The printer of claim 15 wherein an action indicated by the disposition information includes at least one of storing, forwarding, emailing, facsimile transmitting and deleting.

20. An article of manufacture comprising a non-transitory machine-readable medium including data that, when accessed by a machine, cause the machine to perform operations comprising:

receiving a selection of two or more of a plurality of stored print jobs as a first batch of print jobs via a user interface;

releasing the first batch of print jobs for processing in response to the selection;

generating an index separator page including information for each of the two or more print jobs in the first batch of print jobs, wherein the index separator page includes content information and disposition information indicating an action that has been performed for print jobs in the first batch of print jobs that did not print with the index separator page, wherein the disposition information further comprises a disposition date for each of the print jobs that did not print with the index separator page; and transmitting the index separator page with the first batch of print jobs for printing.

21. The article of manufacture of claim 20 wherein generating the index separator page comprises loading content information for each print job in the first batch of print jobs.

* * * * *